United States Patent
Xie et al.

(10) Patent No.: US 12,034,608 B2
(45) Date of Patent: Jul. 9, 2024

(54) NETWORK RESOURCE MANAGEMENT METHOD AND SYSTEM, NETWORK EQUIPMENT AND READABLE STORAGE MEDIUM

(71) Applicant: ZTE Corporation, Shenzhen (CN)

(72) Inventors: Baoguo Xie, Shenzhen (CN); Manchang Ju, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/764,158

(22) PCT Filed: Aug. 20, 2020

(86) PCT No.: PCT/CN2020/110349
§ 371 (c)(1),
(2) Date: Mar. 25, 2022

(87) PCT Pub. No.: WO2021/063130
PCT Pub. Date: Apr. 8, 2021

(65) Prior Publication Data
US 2022/0329495 A1  Oct. 13, 2022

(30) Foreign Application Priority Data
Sep. 30, 2019 (CN) .......................... 201910944775.7

(51) Int. Cl.
*G06F 15/173* (2006.01)
*H04L 41/0894* (2022.01)
*H04L 41/40* (2022.01)

(52) U.S. Cl.
CPC .......... *H04L 41/40* (2022.05); *H04L 41/0894* (2022.05)

(58) Field of Classification Search
CPC .......................... H04L 41/40; H04L 41/0894
See application file for complete search history.

(56) References Cited

U.S. PATENT DOCUMENTS

| 2018/0205637 A1 | 7/2018 | Li |
| 2019/0028350 A1 | 1/2019 | Yeung et al. |

(Continued)

FOREIGN PATENT DOCUMENTS

| CN | 106533935 A | 3/2017 |
| CN | 109885377 A1 | 6/2019 |

(Continued)

OTHER PUBLICATIONS

ETSI GS NFV 006 v2.1.1, Jan. 2021 (Year: 2021).*

(Continued)

*Primary Examiner* — Joseph R Maniwang
(74) *Attorney, Agent, or Firm* — Wolf, Greenfield & Sacks, P.C.

(57) ABSTRACT

A method and a system for network resource management, a network device and a computer-readable storage medium. The method for network resource management may include: acquiring, by a Network Function Virtualization Orchestrator (NFVO) module, a Network Service Descriptor (NSD) and/or a Virtualized Network Function Descriptor (VNFD) from an Operation Support System (OSS) module, wherein the VNFD includes the description of virtual machine resources and container resources; and performing, by a Network Function Management and Orchestration (MANO) system and according to a life cycle deployment policy of an NS or VNF, a life cycle management operation on the NS or VNF in one of a virtual machine mode, a container mode and a hybrid orchestration mode.

12 Claims, 5 Drawing Sheets

(56) References Cited

U.S. PATENT DOCUMENTS

| | | | |
|---|---|---|---|
| 2019/0034244 A1 | 1/2019 | Yang et al. | |
| 2021/0342178 A1* | 11/2021 | Qin | H04L 41/0894 |
| 2022/0075666 A1* | 3/2022 | Xia | G06F 9/45558 |

FOREIGN PATENT DOCUMENTS

| | | |
|---|---|---|
| EP | 3 893 438 A1 | 10/2021 |
| EP | 3 948 541 A1 | 2/2022 |
| JP | 2020-506459 A | 2/2020 |
| WO | WO 2017/166136 A1 | 10/2017 |
| WO | WO 2018/174897 A1 | 9/2018 |

OTHER PUBLICATIONS

Wikipedia, "Network function virtualization", https://en.wikipedia.org/wiki/Network_function_virtualization (Year: 2023).*

International Search Report and Written Opinion for International Application No. PCT/CN2020/110349, dated Nov. 23, 2020.

First Office Action for Chinese Application No. 201910944775.7, dated Apr. 29, 2023.

First Search Report for Chinese Application No. 201910944775.7, dated Apr. 25, 2023.

Examination Report for Indian Patent Application No. 202227024584, dated Sep. 6, 2022.

Office Action for Japanese Application No. 2022-519759, dated May 9, 2023.

Search Report for Japanese Application No. 2022-519759, dated Feb. 28, 2023.

Extended European Search Report for European Application No. 20872299.1 dated Sep. 8, 2023.

First Office Action for Korean Application No. 2022-7014166 dated Aug. 30, 2023.

[No Author Listed], Network Functions Virtualisation (NFV); Management and Orchestration. ETSI GS NFV-MAN 001 V1.1.1. European Telecommunications Standards Institute. Dec. 2014. 184 pages.

[No Author Listed], Network Functions Virtualisation (NFV); Virtualisation Technologies; Report on the application of Different Virtualisation Technologies in the NFV Framework. ETSI GS NFV-EVE 004 V1.1.1. European Telecommunications Standards Institute. Mar. 2016. 23 pages.

[No Author Listed], Network Functions Virtualisation (NFV); Architecture; Report on the Enhancements of the NFV architecture towards "Cloud-native" and "PaaS" Release 3 Draft. ETSI GR NFV-IFA 029 V0.16.0. European Telecommunications Standards Institute. May 2019. 91 pages.

Bujari et al., Service function chaining: A lightweight container-based management and orchestration plane. 2019 16th IEEE Annual Consumer Communications & Networking Conference (CCNC). Jan. 11, 2019. 4 pages.

Hoang et al., An extended virtual network functions manager architecture to support container. Proceedings of the 1st International Conference on Information Science and Systems Apr. 27, 2018:173-76.

* cited by examiner

NETWORK RESOURCE MANAGEMENT METHOD AND SYSTEM, NETWORK EQUIPMENT AND READABLE STORAGE MEDIUM

CROSS-REFERENCE TO RELATED APPLICATION

This application is a national stage filing under 35 U.S.C. § 371 of international application number PCT/CN2020/110349, filed Aug. 20, 2020, which claims priority to Chinese patent application No. 201910944775.7, filed Sep. 30, 2019. The contents of these applications are incorporated herein by reference in their entirety.

TECHNICAL FIELD

Embodiments of the present disclosure relate to, but not limited to, the field of communication, and in particular to, but not limited to, a method and a system for network resource management, a network device and a non-transitory computer-readable storage medium.

BACKGROUND

Network Functions Virtualization (NFV) is a software processing technology that uses general hardware and virtual technology to carry other functions in order to reduce high equipment cost of the network. Through software/hardware decoupling and function abstraction, the NFV enables the functions of network devices to no longer depend on dedicated hardware, so that resources can be shared fully and flexibly to achieve the rapid development and deployment of new services as well as automatic deployment, elastic scaling, fault isolation, self-healing or the like according to actual service requirements.

Figure 1:
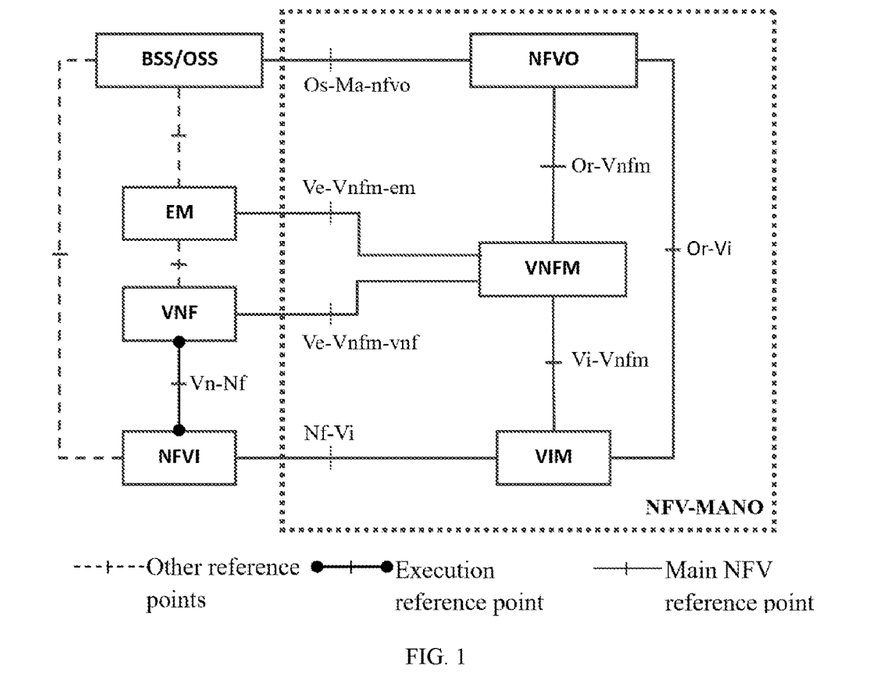
FIG. 1 is an architecture diagram of an ETSI NFV system in the existing technology.

As shown in FIG. 1, the NFV system architecture defined by the European Telecommunications Standards Institute (ETSI) mainly includes: an Operation-Support System/Business Support System (OSS/BSS), Virtualized Network Functions (VNFs), a Network Functions Virtualization Infrastructure (NFVI) and a VNF-management and Orchestration (NFV-MANO) system. The NFVI is mainly configured to fully virtualize and map hardware resources such as computation, storage and network into virtual resources. The NVFs realize various physical network functions by software. The NVFs run on the NFVI and use virtual resources that are virtualized by the NFVI. The NFV-MANO is configured to manage and orchestrate the relationship between the VNFs and the NFVI and the connection relationship between NVFs and/or between NVFs and other physical network functions (PNFs).

The NFV-MANO includes: a Virtualized Infrastructure Manager (VIM), a Virtualized Network Function Manager (VNFM) and a Network Function Virtualization Orchestrator (NFVO). The VIM is configured to control and manage virtualized resources. The VNFM is configured to manage the life cycle of the VNF. The NFVO is configured to orchestrate and manage the virtualized infrastructure and manage the life cycle of the Network Service (NS).

The micro-service architecture is the development and evolution direction of the NFV technology. The micro-service architecture is also based on the application of the cloud native technology and the container technology. As an application packaging technology, the container defines a standardized application publishing format, which greatly facilitates the development, deployment and migration of applications. The technologies such as layered mirroring and centralized mirroring repository adopted by the container promote the micro-service transformation of network elements, and can accelerate the development and deployment of software. By introducing containers, the requirements for the rapid deployment of edge computing services, the requirements of edge computing network elements to improve the resource utilization, and the requirements of deploying 5G control plane networks by utilizing containers are satisfied.

At present, the NFV standard has defined how to manage Virtual Machine (VM) resources (e.g., quota and limit management of VM resources, resource authorization management, resource allocation and recovery management or other operations) during the VNF life cycle management process (e.g., during instantiation, elastic scaling, self-healing, termination or other life cycle management operations). If containers are introduced into the NFV standard, the hybrid orchestration of virtual machines and containers will be involved. Thus, it is necessary to solve how to enhance the support for containers in different entities NFVO, VNFM and VIM of the NFV MANO, how to distinguish a plurality of VNFs in a same Network Service (NS) during the life cycle management operation of the NS or VNF, and whether the life cycle management operation is performed by utilizing virtual machine resources or container resources. However, there are no mechanisms for the hybrid orchestration of containers and virtual machines in the relevant specifications.

SUMMARY

The embodiments of the present disclosure provide a method and a system for network resource management, a network device and a computer-readable storage medium. The technical problem to be solved at least to a certain extent is to provide a scheme which can manage the hybrid orchestration of a virtual machine mode and a container mode during a life cycle management operation.

In order to solve at least the above technical problem to a certain extent, according to an embodiment of the present disclosure, provided is a method for network resource management. The method may include: acquiring, by a Network Function Virtualization Orchestrator (NFVO) module, a Network Service Descriptor (NSD) and/or a Virtualized Network Function Descriptor (VNFD) from an Operation Support System (OSS) module, the VNFD comprising the description of virtual machine resources and container resources; and, performing, by a network function Management and Orchestration (MANO) system and according to a life cycle deployment policy of an NS or VNF, a life cycle management operation on the NS or VNF in one of a virtual machine mode, a container mode and a hybrid orchestration mode.

According to another embodiment of the present disclosure, further provided is a system for network resource management. The system may include an OSS module and a MANO. The OSS module is configured to transmit an NSD and/or VNFD to an NFVO module, the NVFD comprising the description of virtual machine resources and container resources. The MANO is configured to perform, according to a life cycle deployment policy of an NS or VNF, a life cycle management operation on the NS or VNF in one of a virtual machine mode, a container mode and a hybrid orchestration mode.

According to yet another embodiment of the present disclosure, further provided is a network device. The network device may include a processor, a memory and a communication bus. The communication bus is configured to realize communication between the processor and the memory. The processor is configured to execute one or more computer programs stored in the memory to carry out the method for network resource management described above.

According to yet another embodiment of the present disclosure, further provided is a non-transitory computer-readable storage medium having one or more programs stored thereon which, when executed by one or more processors, cause the one or more processors to carry out the method for network resource management described above.

Other features and corresponding beneficial effects of the present disclosure will be described in the later part of the description, and it should be understood that at least some of the beneficial effects will become apparent from the records in the description of the present disclosure.

DETAILED DESCRIPTION

In order to make the objectives, technical schemes and advantages of the present disclosure clearer, the embodiments of the present disclosure will be further described in detail below by specific implementations with reference to the accompanying drawings. It should be understood that the specific embodiments to be described herein are merely for illustrating the present disclosure, and are not intended to limit the present disclosure.

The existing NFV systems cannot support the orchestration of containers, so it is impossible to perform life cycle management on an NS/VNF by introducing containers. The embodiments of the present disclosure provide a method for network resource management and system, which enables hybrid orchestration of virtual machines and containers according to the requirements of deployment, scenario and function implementation during the life cycle management of an NS/VNF. Some network service implementation scenarios need to adopt a container orchestration mode, for example, URLLC ultralow latency services; while some location deployment scenarios need to be deployed by containers, for example, deploying VNFs or VNFCs to edge DCs. In scenarios where container deployment or service implementation are not particularly required, single virtual machine or container deployment or hybrid deployment can be adopted according to the requirements of a third party, to realize the NFVs' abilities to support containers.

In accordance with different embodiments hereinafter, it is described that a Virtualized Network Function Descriptor (VNFD) data model supporting the virtual machine-container hybrid orchestration is required to be enhanced for NFV. The VNFD contains VDU-m for describing virtual machine resources and VDU-c for describing container resources. By utilizing the enhanced VNFD, the single virtual machine orchestration, the single container orchestration and the hybrid orchestration of virtual machines and containers can be supported.

For the deployment mode of the NS or VNF, according to the network policy and the requirements of the third party, both the NS and the VNF have three deployment modes.

The three deployment modes for NS include virtual machine deployment, container deployment, and virtual machine-container hybrid deployment.

In the three deployment modes for the NS, the first mode is an NS virtual machine deployment mode, where all VNFs in the NS are deployed in a virtual machine mode and the VNFD is deployed by utilizing a VNFD-m. The second mode is an NS container deployment mode, where the existing NFV's ability to support container deployment is expanded and the VNFD is deployed by utilizing an expanded VNFD-c. The third mode is an NS virtual machine-container deployment mode, where the existing NFV's ability to support container deployment is expanded, different VNFs in one NS can be deployed according to the deployment policy, and the VNF-m or VNF-c is deployed by utilizing VNFD-m or VNFD-c.

The three deployment modes for VNF include virtual machine deployment, container deployment, and virtual machine-container hybrid deployment.

In the three deployment modes for the VNF, the first mode is a VNF virtual machine deployment mode, where all VNFCs in the VNF are deployed in a virtual machine mode and the virtual machine VNFCs are deployed by utilizing an existing VDU-m in the VNFD. The second mode is a VNF container deployment mode, where the NFV's current ability to support container deployment is expanded, all VNFCs in the VNF are deployed in a container mode and the containerized VNFCs are deployed by utilizing an existing VDU-c in the VNFD. The third mode is a VNFC virtual machine-container deployment mode, where the NFV's current ability to support container deployment is expanded, different VNFCs in the same VNF can be deployed according to the deployment policy, and the virtual machine VNFCs or containerized VNFCs are deployed by utilizing a VDU-m or a VDU-c.

Figure 2:
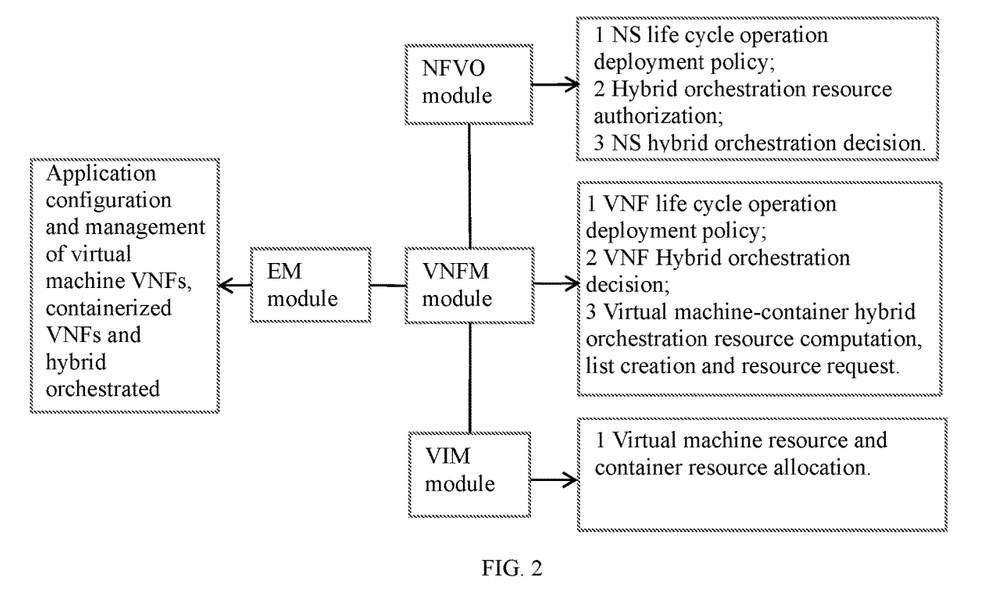
FIG. 2 is a functional block diagram of NFV MANO enhancement according to an embodiment of the present disclosure.

In accordance with the embodiments of the present disclosure, the existing network elements of the NFV MANO and the EMS are enhanced to support the virtual machine-container hybrid orchestration function, as shown in FIG. 2. In order to support the virtual machine-container hybrid orchestration, in addition to that the VNFD needs to be enhanced to support container parameters, the NFVO and the NVFM need to formulate an NS/VNF deployment policy, decide whether VNFs in the NS performs the life cycle management (e.g., instantiation, self-healing, elastic scaling or termination) of the VFN in a virtual machine mode, a container mode or a virtual machine-container hybrid orchestration mode, and download virtual machine mirror images or container mirror images according to the deployment policy. The VNFM needs to execute the life cycle management of the VNF according to the NS/VNF deployment policy, decide whether VNFCs in the same VNF adopt a virtual machine mode, a container mode or a virtual machine-container hybrid orchestration mode, and compute virtual machine or container resources to generate a resource list. The VIM needs to support the creation of virtual machines, and at the same time enhances the support of the allocation of container-based computing resources, storage resources and network resources and creates containers.

How to manage network resources during the life cycle management process of containerized VNFs will be described below by embodiments.

Embodiment I

Figure 3:
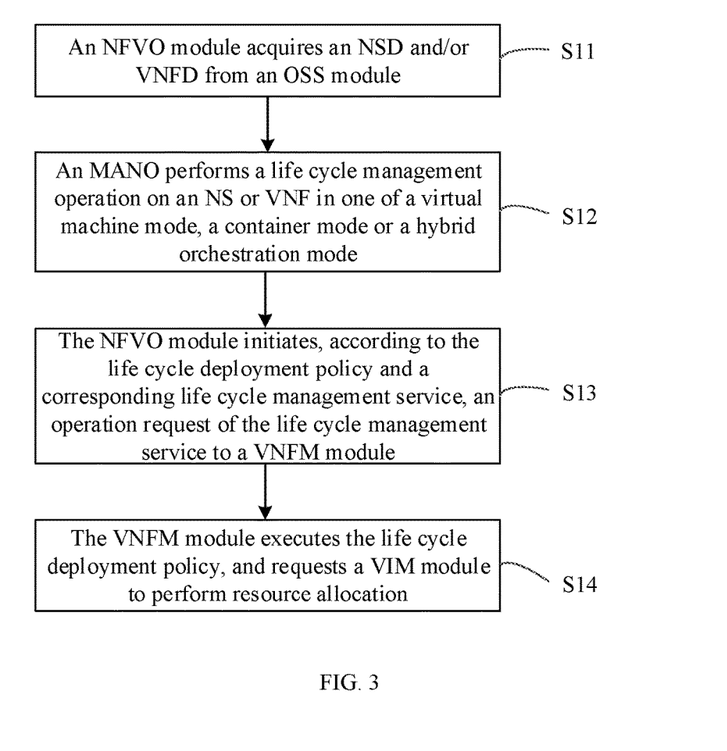
FIG. 3 is a flowchart of a method for network resource management according to Embodiment I of the present disclosure.

The embodiment provides a method for network resource management. With reference to FIG. 3, the method may include steps S11 to S14.

At S11, a network function virtualization orchestrator (NFVO) module acquires a network service descriptor (NSD) and/or a virtualized network function descriptor (VNFD) from an operation support system (OSS).

At S12, a network function management and orchestration (MANO) system performs, according to a life cycle deployment policy of an NS or VNF, a life cycle management operation on the NS or VNF in one of a virtual machine mode, a container mode and a hybrid programming mode.

The performing, by a MANO system and according to a life cycle deployment policy of an NS or VNF, a life cycle management operation on the NS or VNF in one of a virtual machine mode, a container mode and a hybrid programming mode may include: generating, according to a MANO general deployment policy configured by the NFVO module and at least one of three deployment policies carried in the NSD and/or VNFD, a life cycle deployment policy of the NS or VNF.

At S13, the NFVO module initiates, according to the life cycle deployment policy and a corresponding life cycle management service, an operation request of the life cycle management service to a virtualized network function manager (VNFM) module.

At S14, the VNFM module executes the life cycle deployment policy, and requests a virtualized infrastructure manager (VIM) module to perform resource allocation.

In some embodiments, the MANO general deployment policy of the NFVO module is configured according to requirements of an operator and/or a third party.

In some embodiments, a network service (NS) deployment policy is carried in the NSD; and/or, a virtualized network function (VNF) deployment policy is carried in the VNFD.

In some embodiments, the generating, according to a MANO general deployment policy configured by the NFVO module and the deployment policies carried in the NSD and/or VNFD, a life cycle deployment policy includes:

generating an NS life cycle deployment policy according to the NS deployment policy in the NSD and the MANO general deployment policy configured in the NFVO module; or generating a VNF life cycle deployment policy according to the VNF deployment policy in the VNFD and the MANO general deployment policy configured in the NFVO module.

In some embodiments, the NS life cycle deployment policy includes any one of a virtual machine deployment policy, a container deployment policy and a virtual machine-container hybrid deployment policy; and the VNF life cycle deployment policy includes any one of a virtual machine deployment policy, a container deployment policy and a virtual machine-container hybrid deployment policy.

In some embodiments, the VNFD includes at least one VDU-m used for describing virtual machine resources and at least one VDU-c used for describing container resources.

The VDU-m includes the description of a connection point CP-m, the description of a virtual computer node Computer-m and the description of a virtual storage Storage-m, and corresponds to a virtual machine (VM) specification.

The VDU-c includes the description of a connection point CP-c, the description of a virtual computer node Computer-c and the description of a virtual storage Storage-c, and corresponds to a container specification.

Figure 4:
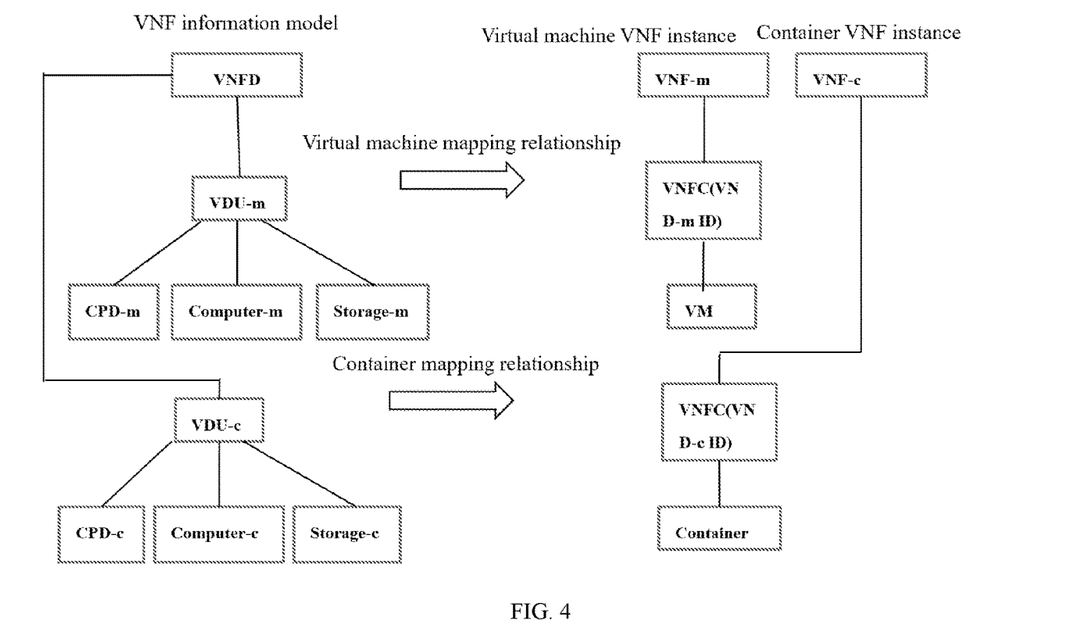
FIG. 4 is a block diagram of a virtualized network functional descriptor (VNFD) according to Embodiment II of the present disclosure.

With reference to FIG. 4, FIG. 4 shows the description of an enhanced VNFD data model, which supports the description of the hybrid orchestration of virtual machine resources and container resources. The left block diagram in FIG. 4 shows an association relationship between VNFDs and the VDU-m, VDU-c and VM and container templates in the enhanced VNFD in a design state, the VDU-m corresponds to the description of virtual machine resources and the VDU-c corresponds to the description of container resources, where:

each VNFD contains one or more VDU-m for describing virtual machine resources and one or more VDU-c for describing container resources;

each VDU-m contains the description of a connection point CP-m, the description of a virtual computer node Computer-m and the description of a virtual storage Storage-m, and corresponds to a VM specification; and each VDU-c contains the description of a connection point CP-c, the description of a virtual computer node Computer-c and the description of a virtual storage Storage-c, and corresponds to a container specification.

The right block diagram in FIG. 4 shows a composition structure of VNF configuration data in a running state (after instantiation), where:

each virtual machine VNF-m consists of one or more VNFCs running on a virtual machine;

each containerized VNF-c consists of one or more VNFCs running on a container;

each VNFC has an attribute VDUID and points to a VDU model in the VNFD, indicating that the VNFC is created according to the VDU-c and VDU-m; and each VNFC instance corresponds to a virtual machine (VM) or a container group (POD).

In the embodiment, the enhanced VNFD supports the description of virtual machine resources (VDU-m) and the description of container resources (VDU-c) and supports the hybrid orchestration of NVF/VNFC. The MANO can perform a life cycle management operation on the VNF/VNFC in a virtual machine mode and a container mode, respectively.

In some embodiments, the VNFM module executing the life cycle deployment policy, and requesting a VIM module to perform resource allocation includes:

generating, by the VNFM module and according to the mode adopted by the life cycle deployment policy, a virtual machine resource list and/or container resource list required by the life cycle management service of the VNF, and initiating a resource authorization request to the VNFO; and initiating a resource allocation request to the corresponding VIM according to a VIM id responsible for a corresponding mode indicated by the NFVO module after authorization, where the VIM module responsible for virtual machine resources allocates virtual machine resources and creates virtual machines, and the VIM responsible for container resources allocates container resources, creates containers and downloads mirror images.

In some embodiments, when the life cycle management service comprises an NVF elastic scaling service and if a containerized VNF is deployed on a virtual machine, the virtual machine is elastically scaled first, followed by the container.

In some embodiments, after the VIM module performs resource allocation, the method further includes:

configuring, by the VNFM module, parameters of the life cycle management service for the VNF.

In some embodiments, after the VNFM module configures parameters of the life cycle management service for the VNF, the method further includes:

notifying the NFVO module and an EMS module the completion of the life cycle management service.

In accordance with the method for network resource management provided in the embodiment, an NFVO module acquires an NSD and/or a VNFD from an OSS module; a life cycle deployment policy is generated according to an MANO general deployment policy configured by the NFVO module and a deployment policy carried in the NSD and/or VNFD; the NFVO module initiates, according to the life cycle deployment policy and the corresponding life cycle management service, an operation request of the life cycle management service to a VNFM; and, the VNFM module executes the life cycle deployment policy and requests the VIM module to perform resource allocation. Thus, a scheme that enables hybrid management on the virtual machine mode and the container mode during a life cycle management operation is provided, and the applications thereof are improved.

Embodiment II

Figure 5:
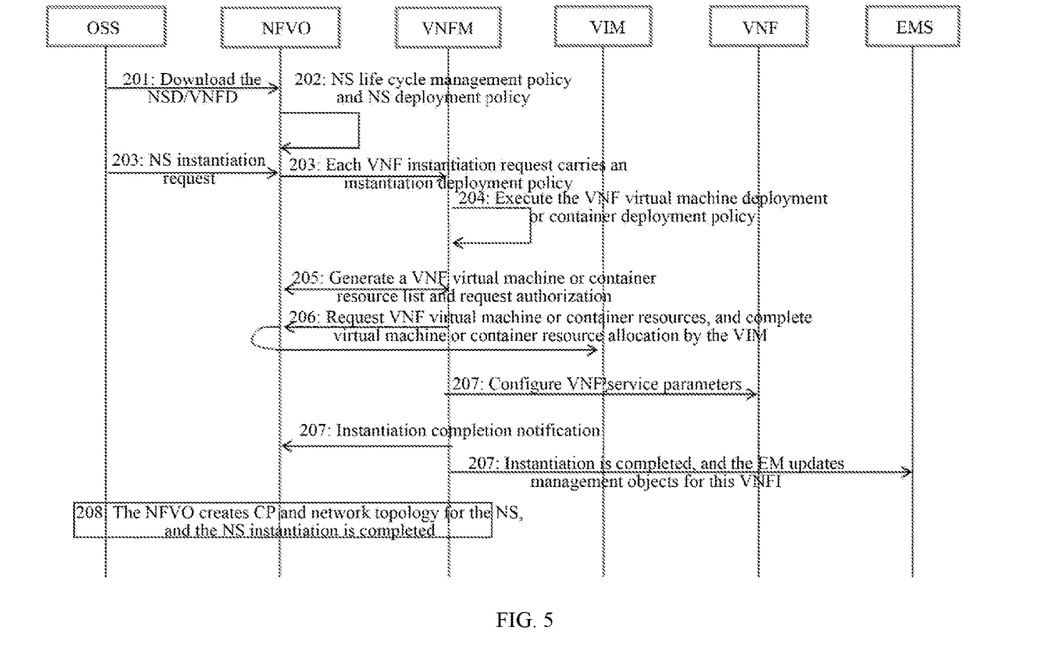
FIG. 5 is a signal flow diagram of a method for network resource management where different VNFs in a same NS adopt a virtual machine mode or a container mode according to Embodiment II of the present disclosure.

FIG. 5 is a signal flow diagram of a method for network resource management according to Embodiment two of the present disclosure. The embodiment mainly describes a process in which a MANO supports VNF hybrid orchestration in an NS deployment scenario. Upon receiving a downloaded NSD/VNFD-m&c, the NFVO generates an NS life cycle deployment policy according to a NS deployment policy in the NSD and a MANO general deployment policy configured by the NFVO, and issues the NS life cycle deployment policy to the NVFM. The VNFM deploys VNFs at different deployment locations and deployment scenarios according to the deployment policy in a virtual machine mode or a container mode and completes VNF instantiation and other life cycle management operations. The NFVO finally completes the deployment operation of the entire NS. During the NS deployment operation, the VNFs forming the NS can be deployed in three modes, i.e., a virtual machine mode, a container mode and a container-virtual machine hybrid mode.

FIG. 5 shows the following steps S201 to S208.

At S201, an OSS performs on-boarding to an NFVO, downloads an NSD and each VNFD-m&c data model file, where the NSD contains the VNFD-m&c id required for each VNF forming the NS and may further contain an NS deployment policy in some examples.

A MANO general deployment policy may also be configured on the NFVO side according to the requirements of an operator or a third party, so the NS deployment policy may come from the operator or the third party.

The NS has three deployment modes, i.e., virtual machine deployment, container deployment, and virtual machine-container hybrid deployment (which only refers to single hybrid deployment in this embodiment)

In the three deployment modes for the NS, the first mode is an NS virtual machine deployment mode, i.e., an existing deployment mode, where all VNFs in the NS are deployed in a virtual machine mode and the VNFD is deployed by utilizing an existing VNFD-m. The second mode is an NS container deployment mode where the NFV's current ability to support container deployment is expanded and the VNFD is deployed by utilizing an expanded VNFD-c. The third mode is an NS virtual machine-container deployment mode, where the NFV's current ability to support container deployment is expanded, different VNFs in one NS can be deployed as required and the VNF-m or VNF-c is deployed by utilizing the VNFD-m or VNFD-c.

At S202, NS deployment type decision: the NFVO generates an NS life cycle deployment policy according to the NS deployment policy in the NSD and the MANO general deployment policy configured by the NFVO. In the NS life cycle deployment policy, a decision is made that different VNFs forming the NS are deployed in which scenario and at which deployment locations in a container deployment mode, a virtual machine deployment mode or a virtual machine-container hybrid deployment mode.

At S203, the OSS initiates an NS instantiation request to the NFVO, and the NFVO notifies, according to different types of VNF descriptions contained in the NSD, the VNFM to initiate an instantiation request of instantizing all VNFs forming the NS (the instantiation request is taken as an example, and other VNF life cycle management operations, such as VNF instantiation, elastic scaling, self-healing or termination may also be possible), where the instantiation request carries an NS instantiation deployment policy (which is one of NS life cycle deployment policies, and other NS life cycle management deployment policies such as an elastic scaling deployment policy or a termination deployment policy is also possible). The policy contains the deployment of different VNF instantiations in a virtual machine mode or a container mode, the acquisition mode of virtual machine mirror images and container mirror images, etc. If the deployment adopts a virtual machine mode, the VNFs need to be instantiated by utilizing virtual machine resources; and, if the deployment adopts a container mode, the VNFs need to be instantiated by utilizing container resources.

At S204, the VNFM needs to be expanded to support containers, and according to the NS instantiation deployment policy, VNFs to be deployed at different locations or in different scenarios are deployed in the virtual machine mode or container mode specified in the policy. For example, according to the NS instantiation deployment policy, VNFs to be deployed at edge DCs are deployed in the container mode, while VNFs to be deployed at center DCs are deployed in the virtual machine mode. VNFs used for a 5G URLLC scenario are deployed in the container mode, while VNFs used for a 5G eMBB scenario are deployed in the virtual machine mode. A certain type of VNFs supporting the MTC service are deployed in the container mode, etc.

The VNFM employs the virtual machine instantiation mode or container instantiation mode for VNFs, and correspondingly performs VNF instantiation by utilizing the VNFD-m or VNFD-c. Thus, the VNFs are called virtual machine VNFs or containerized VNFs.

At S205, the VNFM generates a virtual machine resource list or container resource list required for respective VNF instantiation according to the virtual machine mode or container mode adopted by VNF instantiation, and then initiates a resource authorization request to the NFVO.

At S206, after the NFVO performs authorization, the VNFM initiates a resource allocation request to the VIM according to a VIM id responsible for virtual machine resources and a VIM id responsible for container resources indicated by the NFVO; the VIM responsible for virtual machine resources allocates virtual machine resources and creates virtual machines; the VIM responsible for container resources allocates container resources and creates containers; and, mirror images are downloaded according to a mirror image acquisition mode in the NS instantiation deployment policy. After the VIM performs resource allocation, the VNFM configures instantiation service parameters for the VNF.

During the life cycle management operation of VNF elastic scaling, when the VNF or EM can initiate a VNF elastic scaling request, different elastic scaling operations are executed on the virtual machine VNF and containerized VNF according to the NS elastic scaling deployment policy.

When the container of the containerized VNF is deployed on a virtual machine (the virtual machine serves as infrastructure), the virtual machine is elastically scaled first, followed by the container (if the container is deployed on a bare service, this problem will not occur). However, when the elastic scaling resources are insufficient, the VNFM can give an alarm to the NFVO, and the NFVO reassigns the VIM to allocate resources.

At S207, after VNF instantiation is completed, the NFVO and the EMS are notified that the instantiation is completed. The EMS needs to support the service configuration and management of containerized VNFs, and adds newly-instantiated virtual machine VNFs and containerized VNFs to management objects so as to realize the service configuration and management of the containerized VNFs. During the NS deployment operation, all the VNFs forming the NS can be deployed in the virtual machine mode, in the container mode, or in the container-virtual machine hybrid mode.

At S208, after all VNFs in the NS are instantiated, CP point connection and topology creation are performed on all VNFs in the NS to finally complete the instantiation operation of the NS.

In this process, according to the NS life cycle operation deployment policy (instantiation deployment, elastic scaling deployment, self-healing deployment and the like) of the NFVO, the VNFM selectively deploys VNFs that are to be deployed in different scenarios and different regions in the virtual machine mode or the container mode, generates the respective virtual machine resource list or container resource list, obtains NFVO resource authorization and then applies for virtual machine resources and container resources to the corresponding VIM. After virtual machines and containers are created, mirror images are downloaded according to the mirror image access mode in the policy, and service data is configured for the instantiated VNFs. After VNF instantiation is completed, the EMS is responsible for the service configuration and management of the VNFs. After all the VNFs are instantiated, CP connections and network topologies are created for the virtual machine VNFs and containerized VNFs, so that the instantiation operation of the NS is finally completed.

Embodiment III

Figure 6:
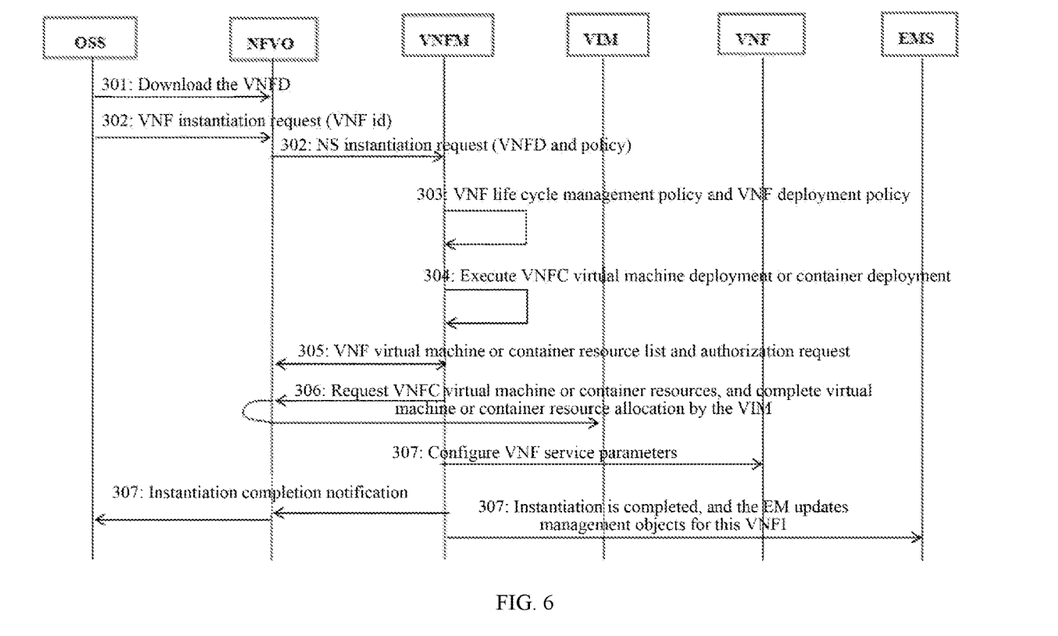
FIG. 6 is a signal flow diagram of a method for network resource management where different VNFCs in a same VNF adopt a virtual machine mode or a container mode according to Embodiment III of the present disclosure.

FIG. 6 is a signal flow diagram of a method for network resource management according to Embodiment three of the present disclosure. The embodiment mainly describes a process in which a MANO supports VNFC hybrid orchestration in a VNF deployment scenario. During the VNF instantiation, upon receiving a VNFD-m&c and MANO general deployment policy issued by the NFVO, the VNFM generates a VNF life cycle deployment policy according to the VNF deployment policy in the VNFD-m&c and the MANO general deployment policy. The VNFM deploys VNFCs with different deployment locations and capabilities in a virtual mode or a container mode according to the deployment policy, and performs a life cycle management operation such as VNFC instantiation. After the VNFC instantiation is completed, the VCFM finally completes the whole VNF deployment operation. During the VNF deployment operation, all the VNFCs forming the VNF can be deployed in one of the virtual machine mode, the container mode and the container-virtual machine hybrid mode.

FIG. 6 shows the following steps S301 to S307.

At S301, an OSS performs on-boarding to an NFVO and downloads a VNF Package file. The package file contains a VNFD-M&C data model file. In some examples, the VNFD-M&C may contain a VNF deployment policy.

A MANO general deployment policy may also be configured on the NFVO side according to the requirements of an operator or a third party.

At S302, the OSS initiates a VNF instantiation operation request to the NFVO (the instantiation request is taken as an example, and other VNF life cycle management operations, such as VNF instantiation, elastic scaling, self-healing or termination may also be possible), where the VNF instantiation operation request carries a certain VNFD-M&C id. The NFVO initiates a VNF instantiation operation request to the VNFM and transmits the VNFD-M&C data model file and the MANO general policy to the VNFM.

At S303, VNF deployment type decision: the VNFM needs to be expanded to support the container deployment mode. The VNFM generates a VNF life cycle deployment policy (containing a VNF instantiation policy, an elastic scaling policy, a self-healing policy, a termination policy and the like) according to the VNF deployment policy in the VNFD-C&M and the MANO general deployment policy. In the VNF life cycle deployment policy, a decision is made that different VNFCs forming the NVF are deployed in which scenarios and at which capability states in a container deployment mode, a virtual machine deployment mode or a virtual machine-container hybrid deployment mode, and the acquisition mode of virtual machine mirror images and container mirror images or the like are also decided.

The VNF has three deployment modes, i.e., virtual machine deployment, container deployment, and virtual machine-container hybrid deployment.

In the three deployment modes for the VNF, the first mode is a VNF virtual machine deployment mode, where all VNFCs in the VNF are deployed in a virtual machine mode and the virtual machine VNFCs are deployed by utilizing an existing VDU-m in the VNFD. The second mode is a VNF container deployment mode, where the NFV's current ability to support container deployment is expanded, all VNFCs in the VNF are deployed in a container mode and the containerized VNFCs are deployed by utilizing an existing VDU-c in the VNFD. The third mode is a VNFC virtual machine-container deployment mode, where the NFV's current ability to support container deployment is expanded, different VNFCs in the same VNF can be deployed as required and the virtual machine VNFCs or containerized VNFCs are deployed by utilizing a VDU-m or a VDU-c.

At S304, the VFNM performs deployment in the virtual machine mode or container mode specified in the policy according to the VNF instantiation deployment policy and different capabilities or different deployment locations of VNFCs. For example, according to the VNF instantiation deployment policy, VNFCs to be deployed at edge DCs are deployed in the container mode, while VNFCs to be deployed at center DCs are deployed in the virtual machine mode. VNFs with low latency and high reliability are deployed in the container mode, while VNFs with high bandwidth and high processing capacity are deployed in the virtual machine mode. A certain type of VNFCs supporting the MTC service are deployed in the container mode, etc. The VNFM employs the virtual machine instantiation mode or container instantiation mode for VNFCs, and correspondingly performs VNF instantiation by utilizing the VNFD-m or VNFD-c in the VNFD-M&C. Thus, the VNFCs are called virtual machine VNFCs or containerized VNFCs.

At S305, the VNFM computes virtual machine resources and container resources required by the VNF according to the virtual machine mode or container mode adopted by the VNFC instantiation, to generate a unified VNF virtual resource list, where the VNF virtual resource list contains a virtual machine resource list or a container resource list required for each VNFC; and then, the VNFM initiates a resource authorization request to the NFVO.

At S306, after the NFVO performs authorization, the VNFM initiates a resource allocation request to the VIM according to a VIM id responsible for virtual machine resources and a VIM id responsible for container resources indicated by the NFVO, where the resource allocation request carries the VNF virtual resource list. The VIM responsible for virtual machine resources allocates virtual machine resources according to the virtual machine resource list in the list, and creates virtual machines. The VIM responsible for container resources allocates container resources according to the container resource list in the list, and creates containers. Respective virtual machine mirror images or container mirror images are downloaded according to a mirror image acquisition mode in the VNF instantiation deployment policy.

After each VNFC is instantiated, the VNFM creates a VNF topology, and configures instantiation service parameters for the VNF.

At S307, after VNF instantiation is completed, the NFVO and the EMS are notified that the instantiation is completed. The EMS needs to support the service configuration and management of containerized VNFs, and adds newly-instantiated VNFs obtained in the virtual machine-container hybrid orchestration mode to management objects so as to realize the service configuration and management of the VNFs. During the VNF deployment operation, all the VNFCs forming the VNF can be deployed in the virtual machine mode, in the container mode or in the container-virtual machine hybrid mode.

In this process, the VNFM generates a VNF life cycle operation deployment policy (instantiation deployment, elastic scaling deployment, self-healing deployment and the like). The VNFM selectively deploys VNFCs with different capabilities or VNFCs to be deployed in different regions in the virtual machine mode or the container mode, contains, in the VNF virtual resource list, the virtual machine resource list or container resource list required by the VNFC, obtains NFVO resource authorization and then applies for virtual machine resources and container resources to the corresponding VIM. After virtual machines and containers are created, virtual machine mirror images or container mirror images are downloaded according to a mirror image access mode in the policy, and service data is configured for the instantiated VNFCs. After VNF instantiation is completed, the EMS is responsible for the service configuration and management of the instantiated VNFs obtained in the virtual machine-container hybrid orchestration mode.

Embodiment IV

Figure 7:
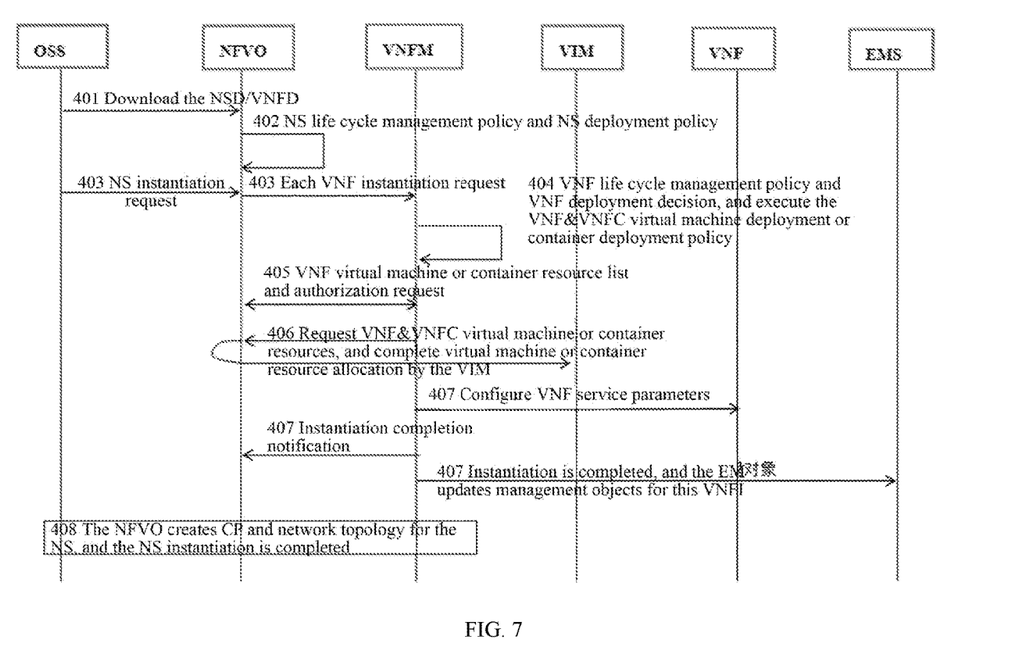
FIG. 7 is a signal flow diagram of a method for network resource management where VNFs in a same NS adopt a virtual machine mode, a container mode or a hybrid orchestration mode according to Embodiment IV of the present disclosure.

FIG. 7 is a signal flow diagram of a method for network resource management according to Embodiment four of the present disclosure. This embodiment mainly describes a process in which a MANO supports VNF&VNFC hybrid orchestration in an NS deployment scenario. Upon receiving a downloaded NSD/VNFD-m&c, the NFVO generates an NS life cycle deployment policy according to a NS deployment policy in the NSD and a MANO general deployment policy configured by the NFVO, and issues the NS life cycle deployment policy to a VNFM. Upon receiving the NSD/VNFD-m&c, the VNFM generates a VNF life cycle deployment policy according to the VNF deployment policy in the VNFD and the MANO general deployment policy. The VNFM deploys VNFs forming the NS in a virtual machine mode, a container mode or a hybrid orchestration mode according to the NS deployment policy and the VNF deployment policy.

FIG. 7 shows the following steps S401 to S407.

At S401, an OSS performs on-boarding to an NFVO, downloads an NSD and each VNFD-M&M data model file, where the NSD contains a VNFD-M&C id required for each VNF forming the NS and may further contain an NS deployment policy in some examples.

A MANO general deployment policy may also be configured on an NFVO side according to the requirements of an operator or a third party, so the NS deployment policy may come from the operator or the third party.

The NS has three deployment modes, i.e., virtual machine deployment, container deployment and virtual machine-container hybrid deployment (including two modes, i.e., single hybrid deployment and complex hybrid deployment).

In the three deployment modes for the NS, the first mode is an NS virtual deployment mode, i.e., an existing deployment mode, where all VNFs in the NS are deployed in a virtual machine mode and the VNFD is deployed by utilizing an existing VNFD-m. The second mode is an NS container deployment mode where the NFV's current ability to support container deployment is expanded and the VNFD is deployed by utilizing an expanded VNFD-c. The third mode is an NS virtual machine-container deployment mode, where the NFV's current ability to support container deployment is expanded, different VNFs in one NS can be deployed as required and the VNF-m or VNF-c is deployed by utilizing a VNFD-m or a VNFD-c. The single hybrid deployment mode means that one VNF can only be deployed by the same type of resources. The complex hybrid deployment mode means that one VNF can be deployed by multiple types of resources. For example, different VNFCs in a VNF can be deployed by virtual machine resources or container resources.

At S402, NS deployment type decision: the NFVO generates an NS life cycle deployment policy according to the NS deployment policy in the NSD and the MANO general deployment policy configured by the NFVO. In the NS life cycle deployment policy, a decision is made that different VNFs forming the NS are deployed in which scenario and at which deployment locations in a container deployment mode, a virtual deployment mode or a virtual machine-container hybrid deployment mode (single mode or complex mode).

At S403, the OSS initiates an NS instantiation request to the NFVO, and the NFVO notifies, according to different types of VNF descriptions contained in the NSD, the VNFM to initiate an instantiation request of instantizing all VNFs forming the NS (the instantiation request is taken as an example, and other VNF life cycle management operations, such as VNF instantiation, elastic scaling, self-healing or termination may also be possible), where the instantiation request carries an NS instantiation deployment policy (which is one of NS life cycle deployment policies, and other NS life cycle management deployment policies such as an elastic scaling deployment policy or a termination deployment policy is also possible). The policy contains the deployment of different VNF instantiations in a virtual machine mode or a container mode, the acquisition mode of virtual machine mirror images and container mirror images, etc. If the deployment adopts a virtual machine mode, the VNFs need to be instantiated by utilizing virtual machine resources. If the deployment adopts a container mode, the VNFs need to be instantiated by utilizing container resources. If the deployment adopts a hybrid orchestration mode, the VNFs need to be instantiated by utilizing both the virtual machine resources and container resources.

At S404, the VNFM needs to be expanded to support containers, and according to the NS instantiation deployment policy, VNFs to be deployed at different locations or in different scenarios are deployed in the virtual machine mode or container mode specified in the policy. For example, according to the NS instantiation deployment policy, VNFs to be deployed at edge DCs are deployed in the container mode, while VNFs to be deployed at center DCs are deployed in the virtual machine mode. VNFs used for a 5G URLLC scenario are deployed in the container mode, while VNFs used for a 5G eMBB scenario are deployed in the virtual machine model. A certain type of VNFs supporting the MTC service are deployed in the container mode, etc.

The VNFM employs the virtual machine instantiation mode or container instantiation mode for VNFs, and correspondingly performs VNF instantiation by utilizing the VNFD-m or VNFD-c. Thus, the VNFs are called virtual machine VNFs or containerized VNFs.

If the VNFs are instantiated in the hybrid orchestration mode, the VNF deployment type needs to be decided. The VNFM generates a VNF life cycle deployment policy (containing a VNF instantiation policy, an elastic scaling policy, a self-healing policy, a termination policy and the like) according to the VNF deployment policy in the VNFD-C&M and the MANO general deployment policy. In the VNF life cycle deployment policy, a decision is made that different VNFCs forming the NVF are deployed in which scenarios and at which capability states in a container deployment mode or a virtual machine deployment mode, and the acquisition mode of virtual machine mirror images and container mirror images or the like are also decided.

In the VNF hybrid orchestration deployment mode, in the same VNF, different VNFCs forming the VNF can be instantiated according to the policy by utilizing the VDU-m or VUD-c and deployed as virtual machine VNFCs or containerized VNFCs.

At S405, the VNFM computes virtual machine resources, container resources or virtual machine-container hybrid orchestration resources required by the VNF according to the virtual machine mode, container mode or hybrid orchestration mode adopted by VNF instantiation, to generate a virtual machine resource list, a container resource list or a hybrid orchestration resource list required by the instantiation of each VNF, and then initiates a resource authorization request to the NFVO.

At S406, after the NFVO performs authorization, the VNFM initiates a resource allocation request to the VIM according to a VIM id responsible for virtual machine resources and a VIM id responsible for container resources indicated by the NFVO. The VIM responsible for virtual machine resources allocates virtual machine resources and creates virtual machines. The VIM responsible for container resources allocates container resources and creates containers. Virtual machine mirror images or container mirror images are downloaded according to a mirror image acquisition mode in the NS instantiation deployment policy or VNF instantiation deployment policy. After the VIM performs resource allocation, the VNFM configures instantiation service parameters for the VNF.

At S407, after VNF instantiation is completed, the NFVO and the EMS are notified that the instantiation is completed. The EMS needs to support the service configuration and management of containerized and hybrid orchestrated VNFs, and adds newly-instantiated virtual machine VNFs, containerized VNFs and hybrid orchestrated VNFs to management objects so as to realize the service configuration and management of containerized VNFs and hybrid orchestrated VNFs. During the NS deployment operation, all the VNFs forming the NS can be deployed in the virtual machine mode, in the container mode or in the container-virtual machine hybrid mode.

At S408, after all VNFs in the NS are instantiated, CP point connection and topology creation are performed on all VNFs in the NS to finally complete the instantiation operation of the NS.

In this process, according to the NS life cycle operation deployment policy (NS instantiation deployment, NS elastic scaling deployment, NS self-healing deployment and the like) of the NFVO and the VNF life cycle operation deployment policy (VNF instantiation deployment, VNF elastic scaling deployment, VNF self-healing deployment and the like) of the VNFM, the VNFM selectively deploys VNFs to be deployed in different scenarios and different regions in the virtual machine mode, the container mode or the hybrid orchestration mode. For VNFs to be deployed in the hybrid orchestration mode, deployment is performed in the virtual machine mode or the container mode according to different capabilities and different deployment locations of VNFCs. The VNFM generates the respective virtual machine resource list, container resource list or hybrid orchestration resource list, then obtains NFVO resource authorization, and applies for virtual machine resources and container resources to the corresponding VIM. After virtual machines and containers are created, mirror images are downloaded according to the mirror image access mode in the policy, and service data is configured for the instantiated VNFs. After VNF instantiation is completed, the EMS is responsible for the service configuration and management of VNFs. After all VNFs are instantiated, CP connections and network topologies are created for the virtual machine VNFs, containerized VNFs or hybrid orchestrated VNFs to finally complete the instantiation operation of the NS.

Embodiment V

Figure 8:
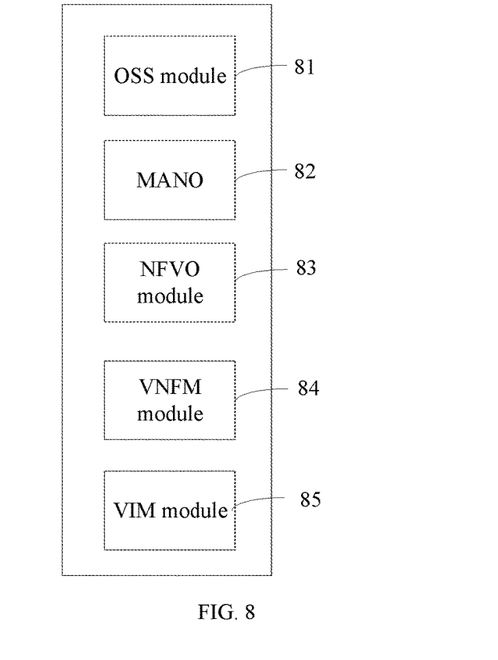
FIG. 8 is a schematic diagram of the composition of a system for network resource management according to Embodiment V of the present disclosure.

The embodiment provides a system for network resource management. With reference to FIG. 8, the system may include: an OSS module 81, a MANO 82, an NFVO module 83, a VNFM module 84 and a VIM module 85.

The OSS module 81 is configured to transmit an NSD and/or VNFD to an NFVO module 83, the NVFD including the description of virtual machine resources and container resources.

The MANO 82 is configured to perform, according to a life cycle deployment policy of an NS or VNF, a life cycle management operation on the NS or VNF in one of a virtual machine mode, a container mode and a hybrid orchestration mode.

The NFVO module 83 is configured to acquire the NSD and/or VNFD, generate a life cycle deployment policy according to a MANO general deployment policy configured by the NFVO module and deployment policies carried in the NSD and/or VNFD, and initiate, according to the life cycle deployment policy and a corresponding life cycle management service, an operation request of the life cycle management service to a VNFM.

The VNFM module 84 is configured to execute the life cycle deployment policy and request a VIM to perform resource allocation.

The VIM module 85 is configured to perform resource allocation.

In some embodiments, the MANO general deployment policy of the NFVO module 83 is configured according to the requirements of an operator and/or a third party.

In some embodiments, a network service (NS) deployment policy is carried in the NSD; and/or, a virtualized network function (VNF) deployment policy is carried in the VNFD.

In some embodiments, generating, according to the MANO general deployment policy configured by the NFVO module 83 and the deployment policies carried in the NSD and/or VNFD, a life cycle deployment policy includes:
generating an NS life cycle deployment policy according to the NS deployment policy in the NSD and the MANO general deployment policy configured in the NFVO module 83; or
generating a VNF life cycle deployment policy according to the VNF deployment policy in the VNFD and the MANO general deployment policy configured in the NFVO module 83.

In some embodiments, the NS life cycle deployment policy includes any one of a virtual machine deployment policy, a container deployment policy and a virtual machine-container hybrid deployment policy; and
the VNF life cycle deployment policy includes any one of a virtual machine deployment policy, a container deployment policy and a virtual machine-container hybrid deployment policy.

In some embodiments, the VNFD includes at least one VDU-m used for describing virtual machine resources and at least one VDU-c used for describing container resources;
the VDU-m includes the description of a connection point CP-m, the description of a virtual computer node Computer-m and the description of a virtual storage Storage-m, and corresponds to a virtual machine (VM) specification; and the VDU-c includes the description of a connection point CP-c, the description of a virtual computer node Computer-c and the description of a virtual storage Storage-c, and corresponds to a container specification.

In some embodiments, the VNFM module 84 executing the life cycle deployment policy and requesting a VIM module to perform resource allocation includes:
generating, by the VNFM module 84 and according to the mode adopted by the life cycle deployment policy, a virtual machine resource list and/or container resource list required by the life cycle management service of the VNF, and initiating a resource authorization request to the VNFO; and
initiating a resource allocation request to a corresponding VIM according to a VIM id responsible for the corresponding mode indicated by the NFVO module 83 after authorization, where the VIM module 85 responsible for virtual machine resources allocates virtual machine resources and creates virtual machines, and the VIM responsible for container resources allocates container resources, creates containers and downloads mirror images.

In some embodiments, when the life cycle management service comprises an NVF elastic scaling service and if a containerized VNF is deployed on a virtual machine, the virtual machine is elastically scaled first, followed by the container.

In some embodiments, the VNFM module 84 is further configured to: configure parameters of the life cycle management service for the VNF after the VIM performs resource allocation.

In some embodiments, after the VNFM module 84 configures parameters of the life cycle management service for the VNF, the following step is further included:
notifying the NFVO module 83 and an EMS module the completion of the life cycle management service.

The system for network resource management provided in this embodiment includes: an OSS module 81, a MANO 82, an NFVO module 83, a VNFM module 84 and a VIM module 85. The OSS module 81 is configured to transmit an NSD and/or VNFD to an NFVO module 83. The NFVO module 83 configured to acquire the NSD and/or VNFD, generate a life cycle deployment policy according to the MANO general deployment policy configured by the NFVO module and the deployment policies carried in the NSD and/or VNFD, and initiate, according to the life cycle deployment policy and a corresponding life cycle management service, an operation request of the life cycle management service to a VNFM. The VNFM module 84 is configured to execute the life cycle deployment policy and request a VIM to perform resource allocation. The VIM module 85 is configured to perform resource allocation. Thus, a scheme that enables hybrid management on the virtual machine mode and the container mode during a life cycle management operation is provided, and the applications thereof are improved.

Embodiment VI

Figure 9:
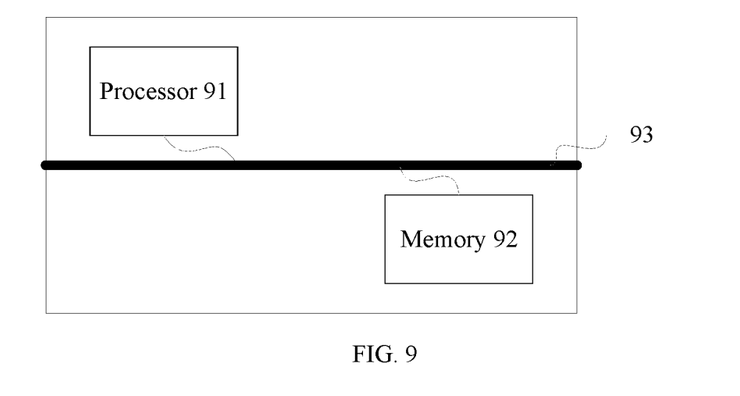
FIG. 9 is a schematic structural diagram of a network device according to Embodiment VI of the present disclosure.

The embodiment further provides a network device. As shown in FIG. 9, The network device may include a processor 91, a memory 92 and a communication bus 93.

The communication bus 93 is configured to realize communication between the processor 91 and the memory 92.

The processor 91 is configured to execute to one or more computer programs stored in the memory 92 to carry out the method for network resource managements in the above embodiments, which will not be repeated here.

The embodiment further provides a computer-readable storage medium, including volatile or non-volatile and moveable or non-moveable mediums implemented in any method or technology used to store information (such as computer-readable instructions, data structures, computer program modules or other data). The computer-readable storage medium includes, but not limited to, random access memories (RAMs), read-only memories (ROMs), electrically erasable programmable read only memories (EEPROMs), flash memories or other memory technologies, compact disc read-only memories (CD-ROMs), digital versatile disks (DVDs) or other optical disk memories, magnetic cassettes, magnetic tapes, magnetic disk memories or other magnetic memory devices, or any other mediums that can be configured to store desired information and can be accessed by computers.

The computer-readable storage medium in the embodiment can be configured to store one or more computer programs which, when executed by a processor, cause the processor to carry out the method for network resource management in the above embodiments.

The embodiment further provides a computer program (or referred to as computer software) that can be distributed on a computer-readable medium and which, when executed by a computing system, causes the computing system to carry out the method for network resource management in the above embodiments.

This embodiment further provides a computer program product, including a computer-readable system having the above-described computer program stored thereon. The computer-readable system in this embodiment may include the computer-readable storage medium described above.

The embodiments of the present disclosure have the following beneficial effects.

In the method for network resource management, the system for network resource management, the network device and the readable storage medium according to the embodiments of the present disclosure, a network function virtualization orchestrator (NFVO) module acquires a network service descriptor (NSD) and/or a virtualized network function descriptor (VNFD) from an operation support system (OSS) module, the VNFD including the description of virtual machine resources and container resources. A network function management and orchestration (MANO) system performs, according to a life cycle deployment policy of an NS or VNF, a life cycle management operation on the NS or VNF in one of a virtual machine mode, a container mode and a hybrid programming mode. Thus, a scheme that enables hybrid management on the virtual machine mode and the container mode during a life cycle management operation is provided.

Thus, it should be understood by those having ordinary skills in the art that all or some of the steps in the methods disclosed above and the functional modules/units in the systems and systems disclosed above can be implemented as software (which can be implemented by computer program codes executable by computing systems), firmware, hardware and suitable combinations thereof. In the hardware implementation, the division of the functional modules/units mentioned above does not necessarily correspond to the division of physical components. For example, one physical component may have multiple functions, or one function or step may be cooperatively executed by a plurality of physical components. Some or all of the physical components may be implemented as software executed by processors such as central processors, digital signal processors or microprocessors, or implemented as hardware, or implemented as integrated circuits such as application-specific integrated circuits.

In addition, as well-known to a person having ordinary skills in the art, the communication medium generally contains computer-readable instructions, data structures, computer program modules or other data in modulation data signals such as carriers or other transmission mechanisms, and may include any information transfer medium. Therefore, the present disclosure is not limited to any particular combination of hardware and software.

The forgoing description merely shows the further detailed description of the embodiments of the present disclosure with reference to specific implementations, and the specific implementations of the present disclosure shall not be deemed as being limited thereto. A person having ordinary skill in the art can make a number of simple derivations or replacements without departing from the concept of the present disclosure, and the derivations or replacements shall fall into the protection scope of the present disclosure.

The invention claimed is:

1. A method for network resource management, comprising:
using one or more processors, executing one or more computer programs stored on at least one non-transitory computer-readable storage medium to carry out:
acquiring, by a Network Function Virtualization Orchestrator (NFVO), a Network Service Descriptor (NSD) and/or a Virtualized Network Function Descriptor (VNFD) from an Operation Support System (OSS), wherein the VNFD comprises a description of virtual machine resources and container resources; and
performing, by a Network Function Management and Orchestration (MANO) and according to a life cycle deployment policy of an NS or VNF, a life cycle management operation on the NS or VNF in one of a virtual machine mode, a container mode and a hybrid orchestration mode;
wherein the performing, by a MANO and according to a life cycle deployment policy of an NS or VNF, a life cycle management operation on the NS or VNF in one of a virtual machine mode, a container mode and a hybrid programming mode comprises:
generating, according to a MANO general deployment policy configured by the NFVO and at least one of three deployment policies carried in the NSD and/or VNFD, a life cycle deployment policy of the NS or VNF;
initiating, by the NFVO and according to the life cycle deployment policy and a corresponding life cycle management service, an operation request of the life cycle management service to a Virtualized Network Function Manager (VNFM); and
executing, by the VNFM, the life cycle deployment policy, and requesting a Virtualized Infrastructure Manager (VIM) to perform resource allocation.

2. The method for network resource management of claim 1, wherein the MANO general deployment policy of the NFVO is configured according to requirements of an operator and/or a third party.

3. The method for network resource management of claim 1, wherein a Network Service (NS) deployment policy is carried in the NSD; and/or, a Virtualized Network Function (VNF) deployment policy is carried in the VNFD.

4. The method for network resource management of claim 3, wherein the generating, according to a MANO general deployment policy configured by the NFVO and the deployment policies carried in the NSD and/or VNFD, a life cycle deployment policy comprises:
generating an NS life cycle deployment policy according to the NS deployment policy in the NSD and the MANO general deployment policy configured in the NFVO; or
generating a VNF life cycle deployment policy according to the VNF deployment policy in the VNFD and the MANO general deployment policy configured in the NFVO.

5. The method for network resource management of claim 4, wherein the NS life cycle deployment policy comprises one of a virtual machine deployment policy, a container deployment policy and a virtual machine-container hybrid deployment policy; and
the VNF life cycle deployment policy comprises one of a virtual machine deployment policy, a container deployment policy and a virtual machine-container hybrid deployment policy.

6. The method for network resource management of claim 1, wherein the VNFD comprises at least one VDU-m used for describing virtual machine resources and at least one VDU-c used for describing container resources;
the VDU-m comprises a description of a connection point CP-m, a description of virtual computer node Computer-m and a description of a virtual storage Storage-m, and corresponds to a virtual machine (VM) specification; and
the VDU-c comprises a description of a connection point CP-c, a description of a virtual computer node Computer-c and a description of a virtual storage Storage-c, and corresponds to a container specification.

7. The method for network resource management of claim 1, wherein the executing, by the VNFM, the life cycle deployment policy, and requesting a VIM to perform resource allocation comprises:
generating, by the VNFM and according to a mode adopted by the life cycle deployment policy, a virtual machine resource list and/or container resource list required by the life cycle management service of the VNF, and initiating a resource authorization request to the VNFO; and
initiating a resource allocation request to a corresponding VIM according to a VIM id responsible for a corresponding mode indicated by the NFVO after authorization, wherein a VIM responsible for virtual machine resources allocates virtual machine resources and creates virtual machines, and a VIM responsible for container resources allocates container resources, creates containers and downloads mirror images.

8. The method for network resource management of claim 7, wherein, in response to the life cycle management service comprising a VNF elastic scaling service and a containerized VNF being deployed on a virtual machine, the virtual machine is elastically scaled first, followed by a container.

9. The method for network resource management of claim 1, after the performing recourse allocation by the VIM, further comprising:
configuring, by the VNFM, parameters of the life cycle management service for the VNF.

10. The method for network resource management of claim 9, after the configuring, by the VNFM, parameters of the life cycle management service for the VNF, further comprising:
notifying the NFVO and an EMS the completion of the life cycle management service.

11. A network device, comprising a processor, a memory and a communication bus, wherein:
the communication bus is configured to realize communication between the processor and the memory; and
the processor is configured to execute one or more computer programs stored in the memory to carry out a method for network resource management, comprising:
acquiring, by a Network Function Virtualization Orchestrator (NFVO), a Network Service Descriptor (NSD) and/or a Virtualized Network Function Descriptor (VNFD) from an Operation Support System (OSS), wherein the VNFD comprises a description of virtual machine resources and container resources; and
performing, by a Network Function Management and Orchestration (MANO) and according to a life cycle deployment policy of an NS or VNF, a life cycle management operation on the NS or VNF in one of a virtual machine mode, a container mode and a hybrid orchestration mode;
wherein the performing, by a MANO and according to a life cycle deployment policy of an NS or VNF, a life cycle management operation on the NS or VNF in one of a virtual machine mode, a container mode and a hybrid programming mode comprises:
generating, according to a MANO general deployment policy configured by the NFVO and at least one of three deployment policies carried in the NSD and/or VNFD, a life cycle deployment policy of the NS or VNF;
initiating, by the NFVO and according to the life cycle deployment policy and a corresponding life cycle management service, an operation request of the life cycle management service to a Virtualized Network Function Manager (VNFM); and
executing, by the VNFM, the life cycle deployment policy, and requesting a Virtualized Infrastructure Manager (VIM) to perform resource allocation.

12. At least one non-transitory computer-readable storage medium having one or more computer programs stored thereon which, when executed by one or more processors, cause the one or more processors to carry out a method for network resource management, comprising:
using the one or more processors, executing the one or more computer programs stored on the at least one non-transitory computer-readable storage medium to carry out:
acquiring, by a Network Function Virtualization Orchestrator (NFVO), a Network Service Descriptor (NSD) and/or a Virtualized Network Function Descriptor (VNFD) from an Operation Support System (OSS), wherein the VNFD comprises a description of virtual machine resources and container resources; and
performing, by a Network Function Management and Orchestration (MANO) and according to a life cycle deployment policy of an NS or VNF, a life cycle management operation on the NS or VNF in one of a virtual machine mode, a container mode and a hybrid orchestration mode;
wherein the performing, by a MANO and according to a life cycle deployment policy of an NS or VNF, a life cycle management operation on the NS or VNF in one of a virtual machine mode, a container mode and a hybrid programming mode comprises:
generating, according to a MANO general deployment policy configured by the NFVO and at least one of three deployment policies carried in the NSD and/or VNFD, a life cycle deployment policy of the NS or VNF;

initiating, by the NFVO and according to the life cycle deployment policy and a corresponding life cycle management service, an operation request of the life cycle management service to a Virtualized Network Function Manager (VNFM); and executing, by the VNFM, the life cycle deployment policy, and requesting a Virtualized Infrastructure Manager (VIM) to perform resource allocation.

* * * * *